May 10, 1927.
J. H. HERTNER ET AL
1,628,145
VEHICLE
Filed Oct. 30, 1920
13 Sheets-Sheet 4
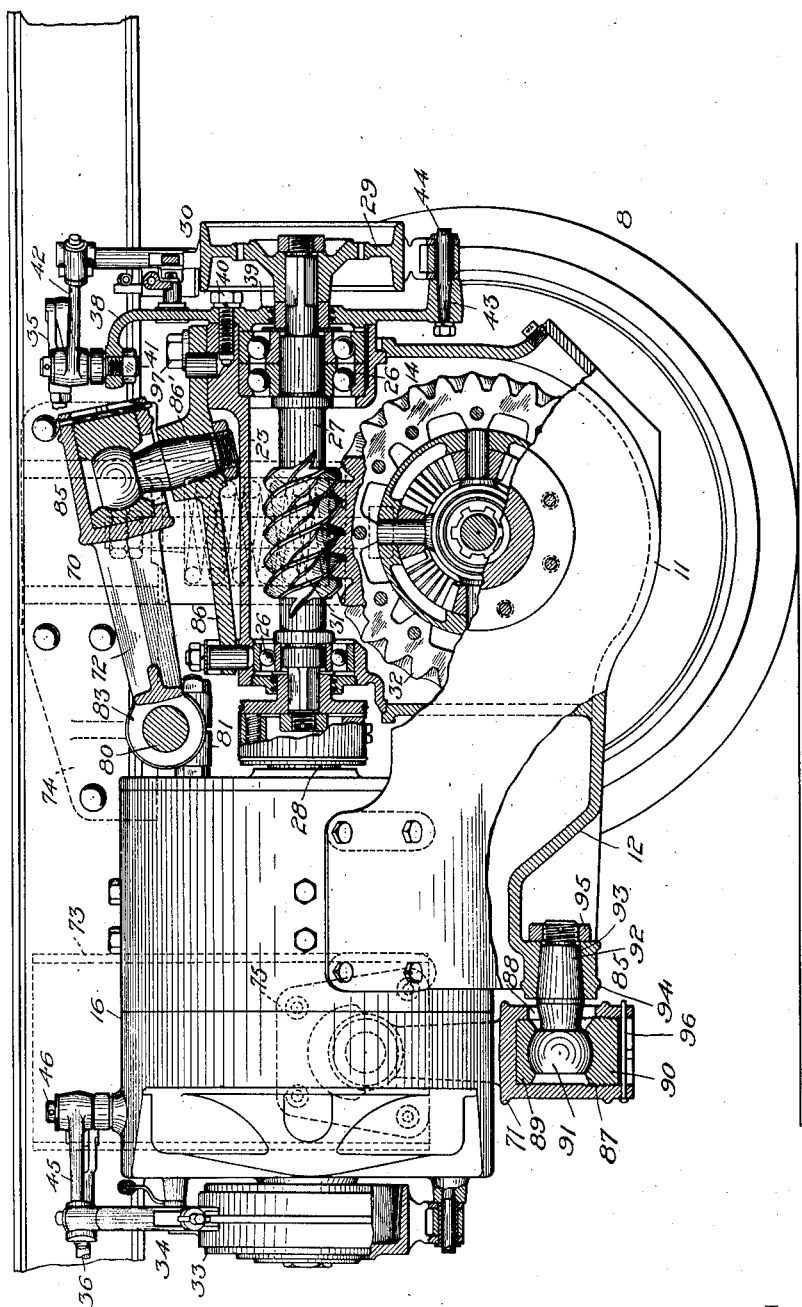

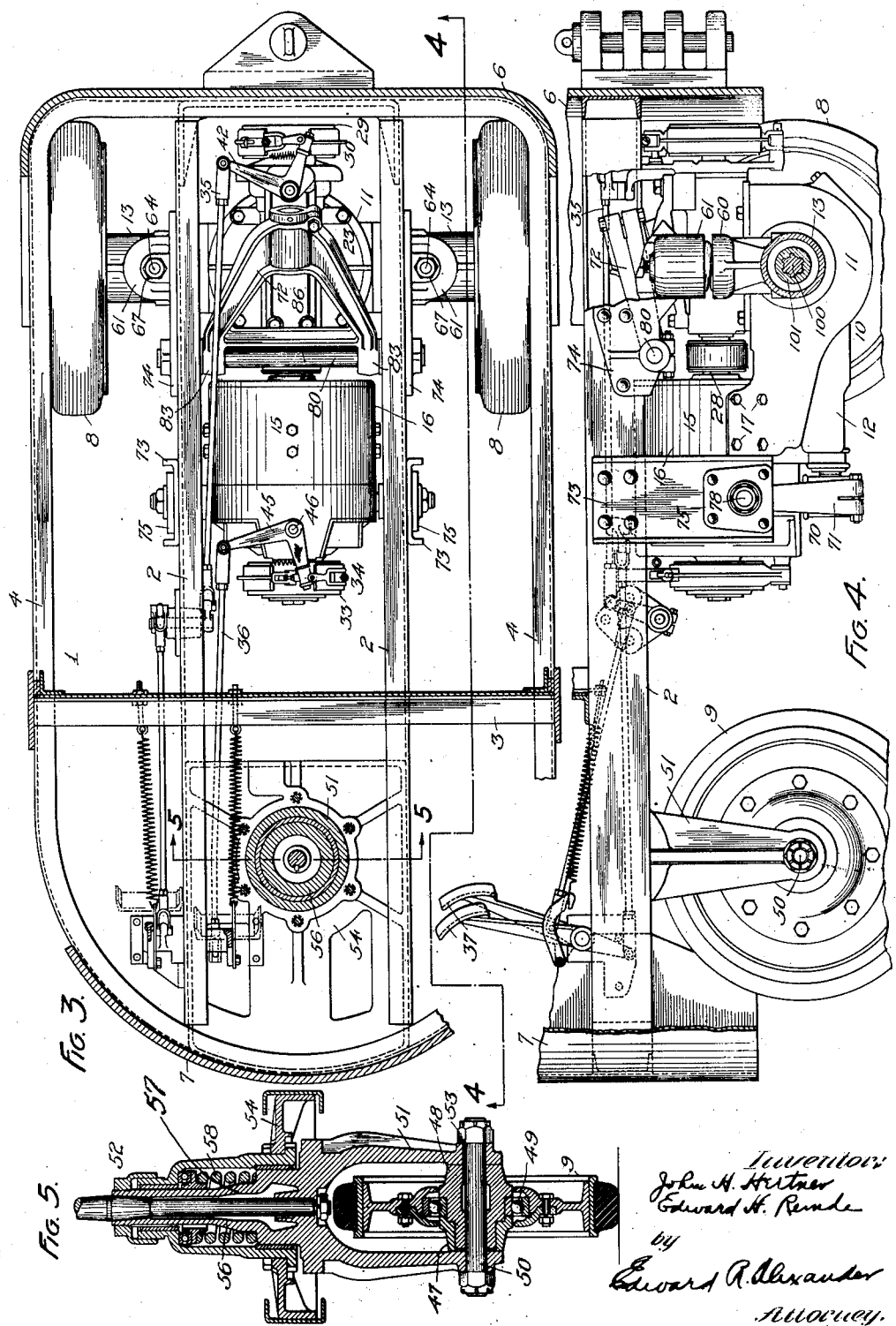

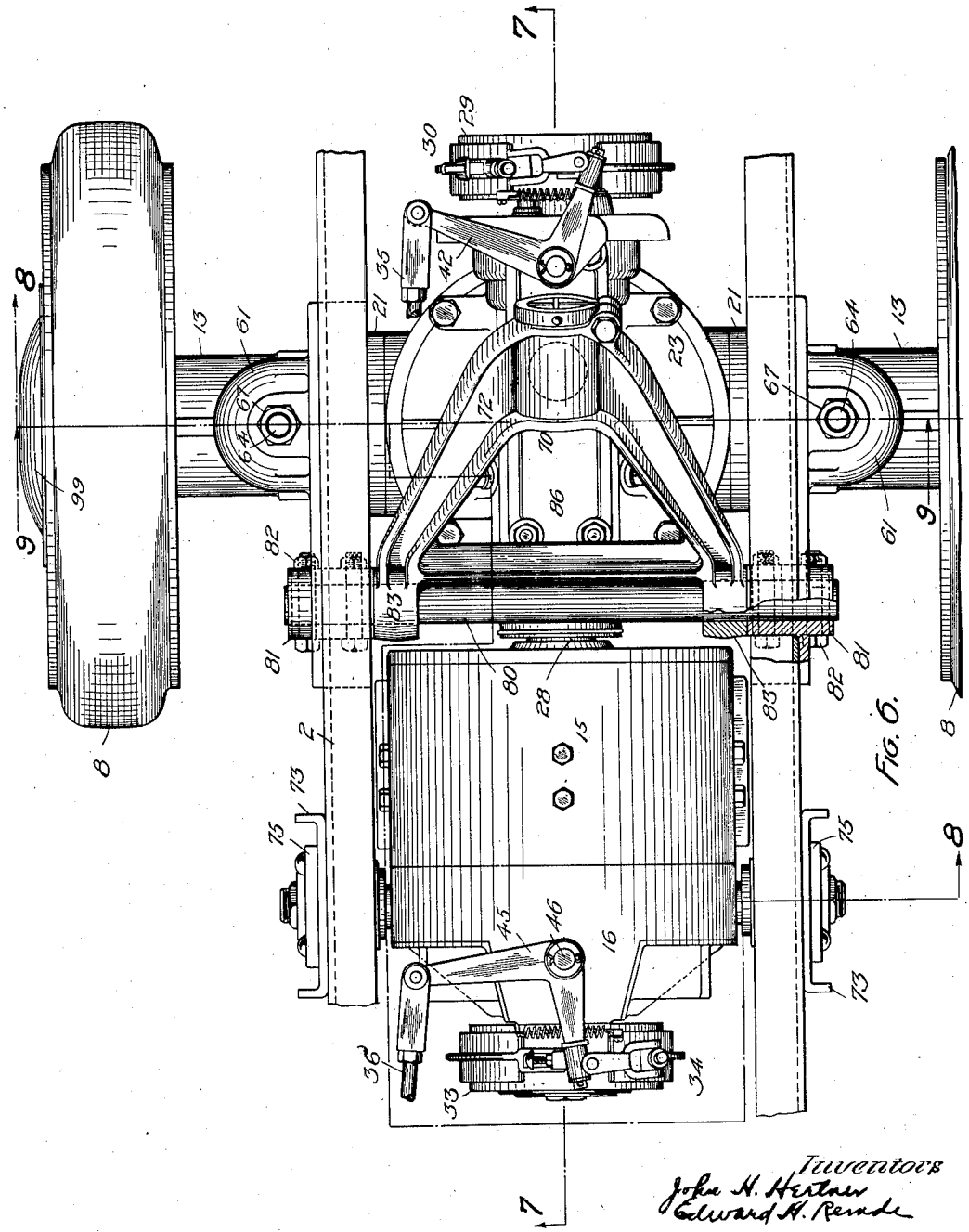

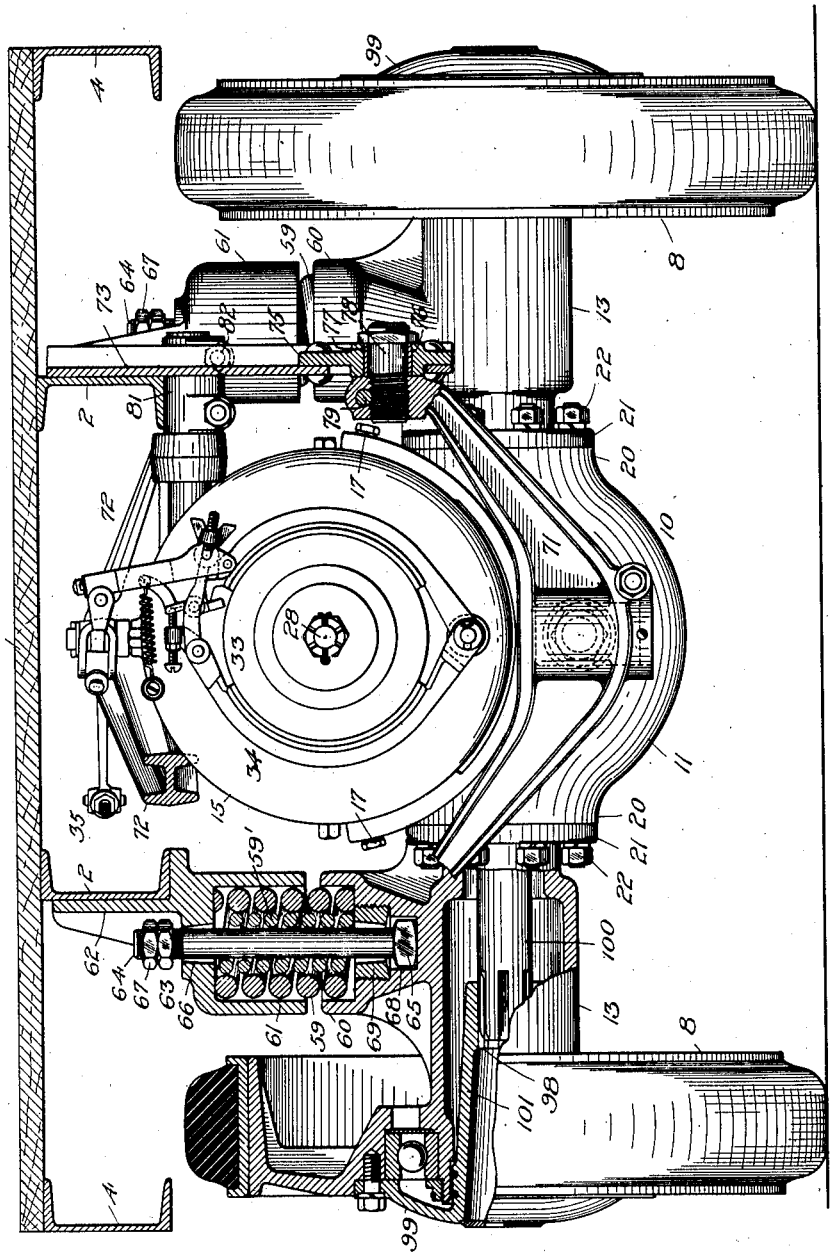

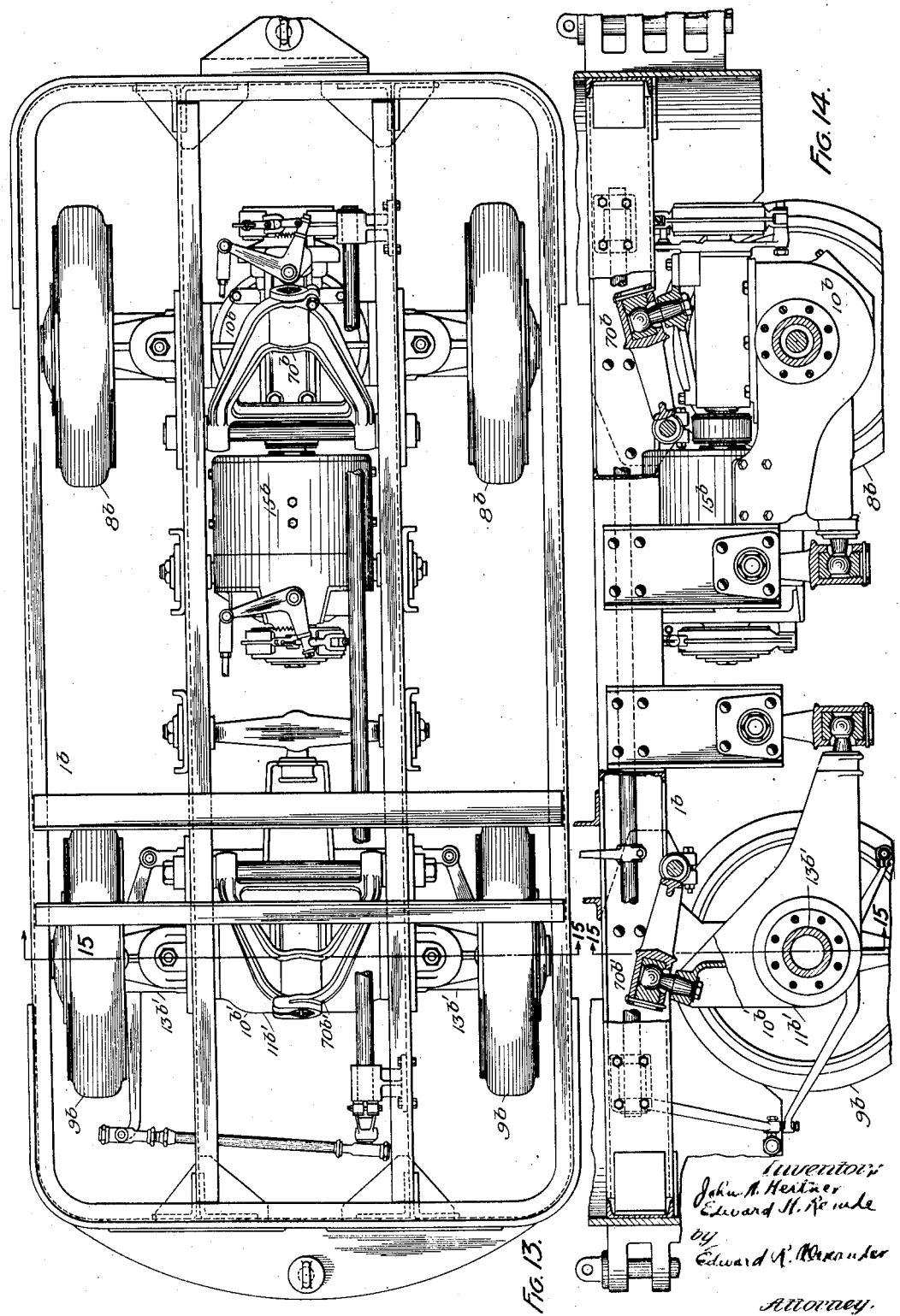

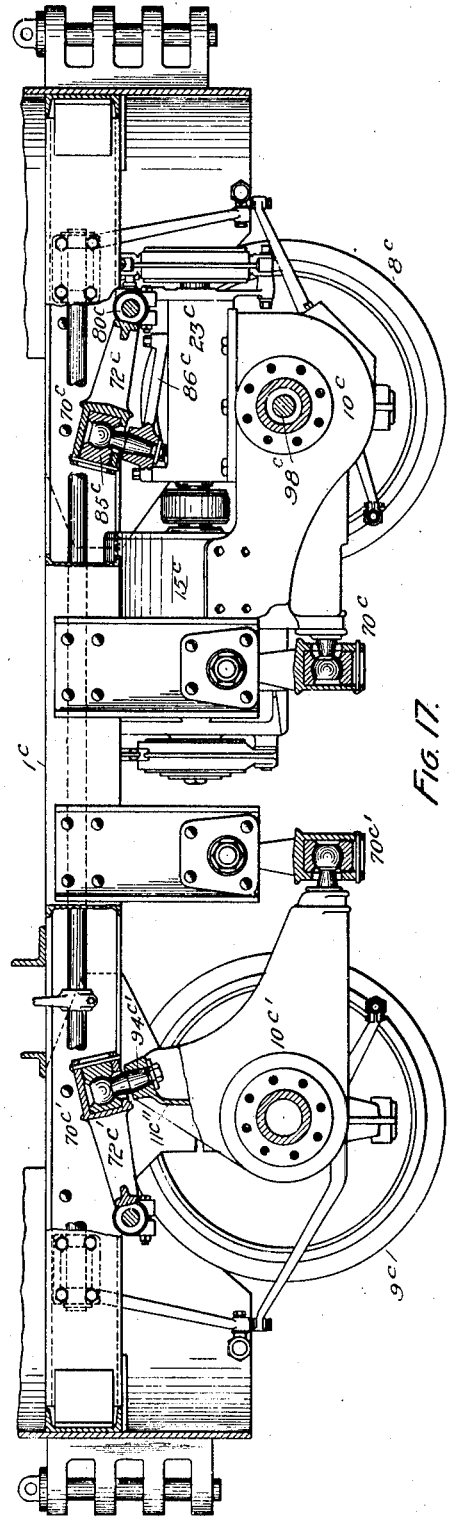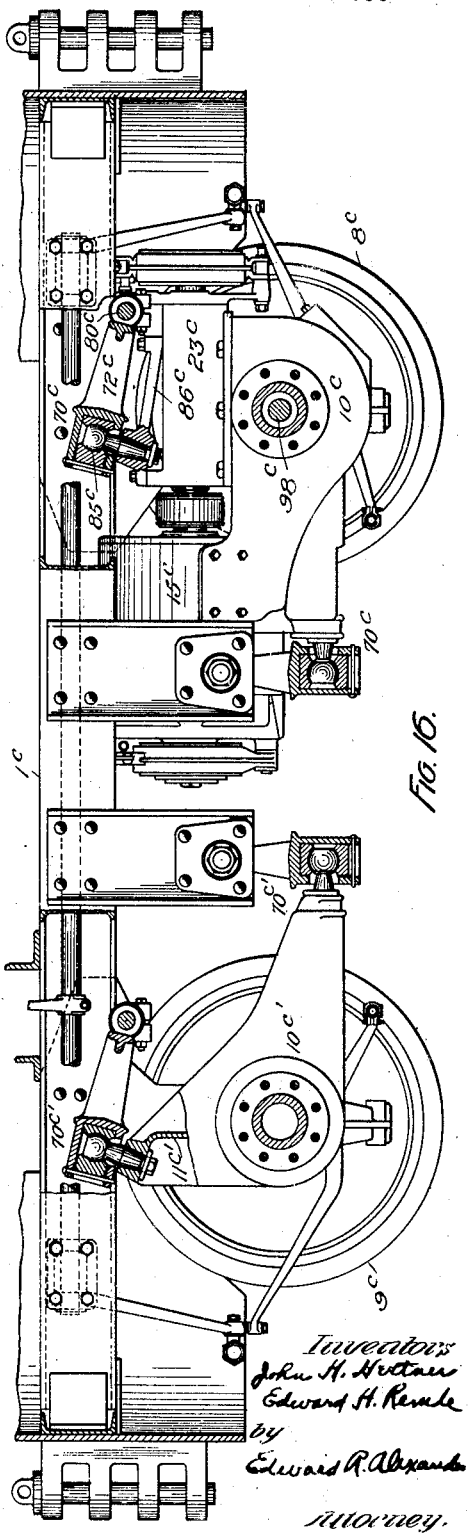

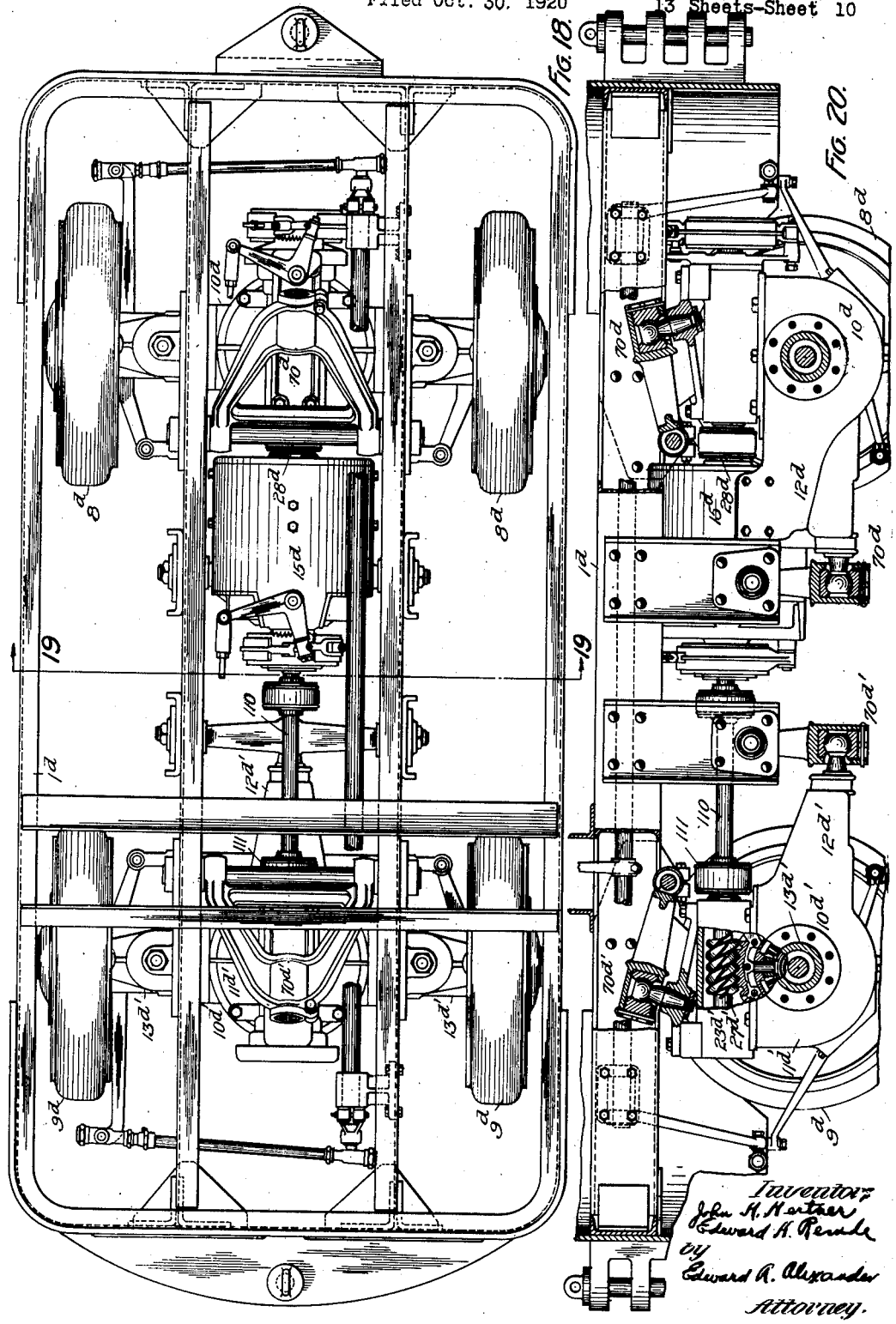

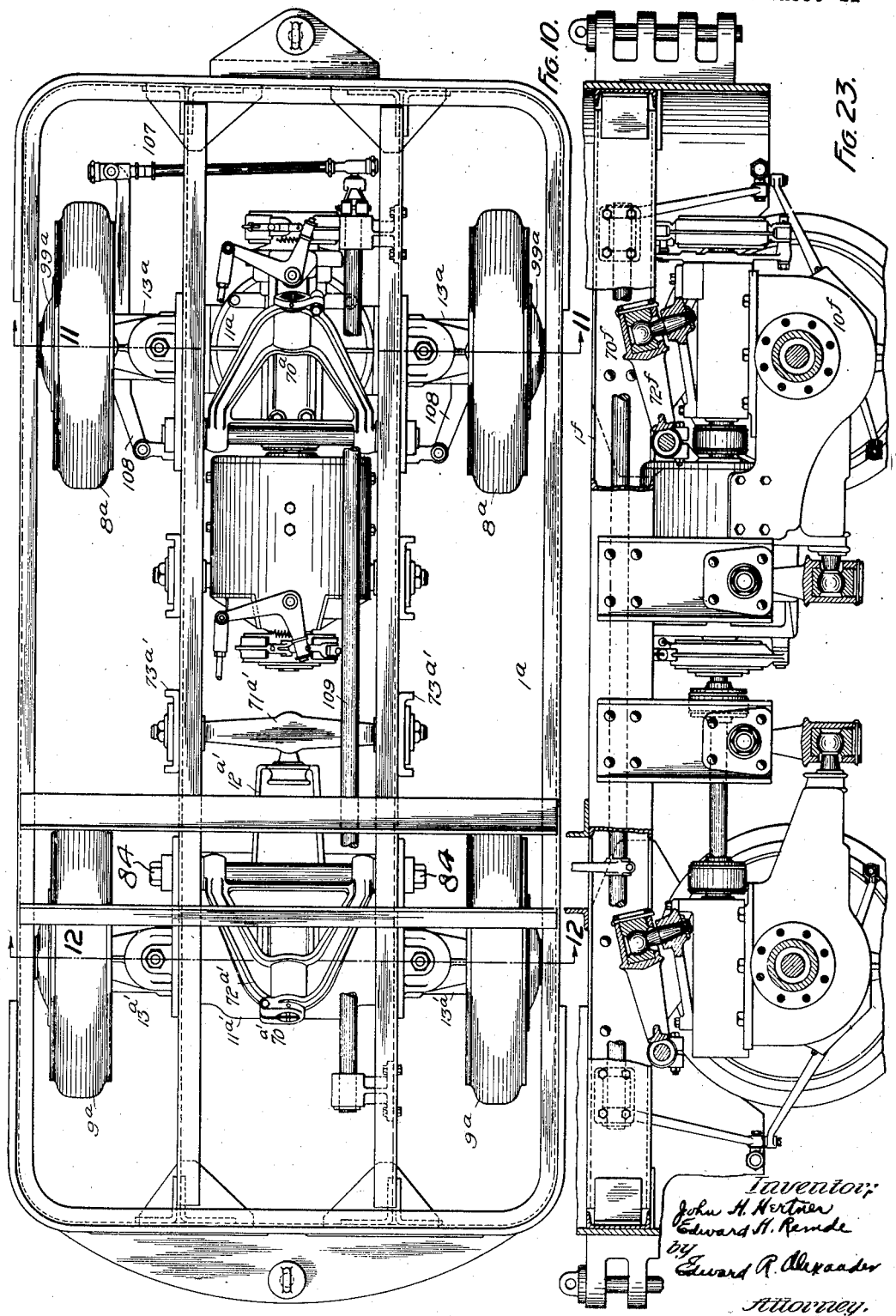

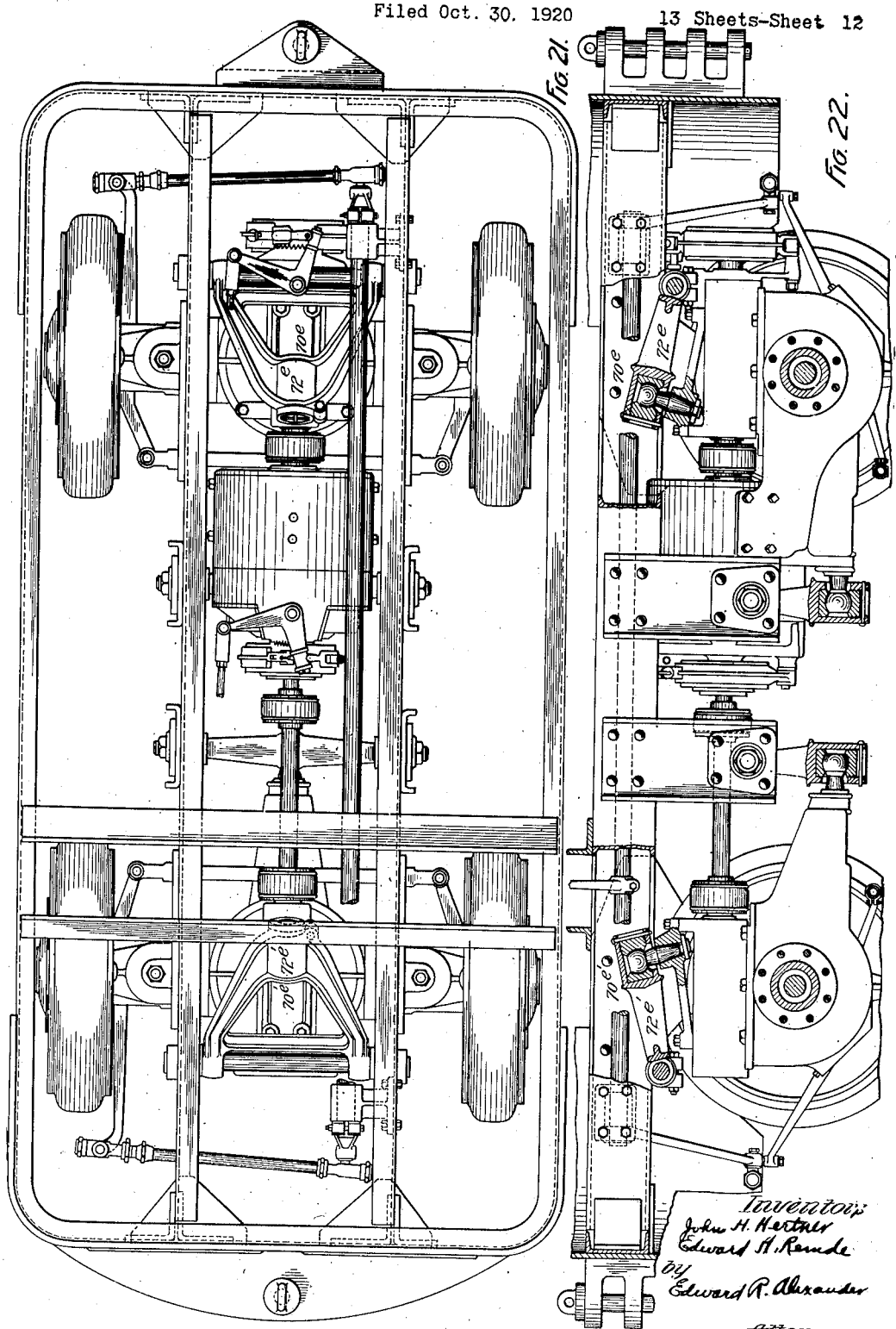

May 10, 1927.  
J. H. HERTNER ET AL  
1,628,145  
VEHICLE  
Filed Oct. 30, 1920   13 Sheets-Sheet 13
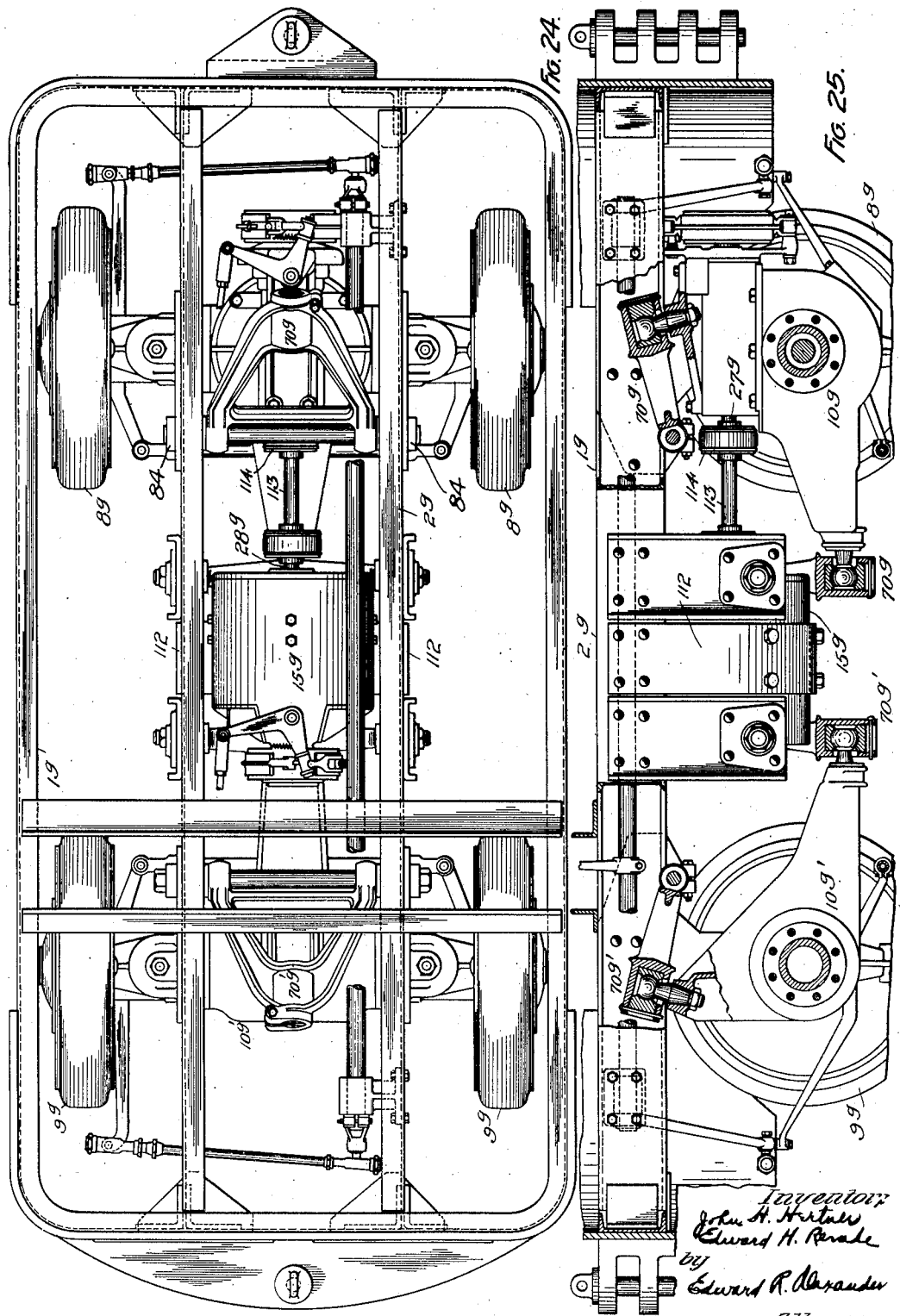

Patented May 10, 1927.

1,628,145

UNITED STATES PATENT OFFICE.

JOHN H. HERTNER AND EDWARD H. REMDE, OF CLEVELAND, OHIO, ASSIGNORS TO THE BAKER-RAULANG COMPANY, OF CLEVELAND, OHIO, A CORPORATION OF OHIO.

VEHICLE.

Application filed October 30, 1920. Serial No. 420,630.

This invention relates to vehicles, more particularly to the running gear therefor.

I have chosen to show the invention as applied to motor trucks and tractors, but it will be understood that the invention is also applicable to other forms of vehicles.

One object of the invention is to provide an improved running gear between either or both axles of a vehicle and its frame, whereby undue strains and stresses upon the axle or axles, incident to the operation of the vehicle are prevented, and the operative relation of the connections between the vehicle frame and either or both axles, and brake and steering mechanisms thereon, including the pedals and levers for operating and controlling the vehicle, are at all times maintained.

Another object of the invention is to provide between the vehicle frame and the axle mechanism or mechanisms for the vehicle an improved suspension mechanism which permits all necessary relative movement thereof while maintaining the axis or axes of the wheels in a substantially neutral position, thus insuring when the axle mechanism embodies power transmitting devices, alignment at all times between such devices and the motor.

Another object of the invention is to provide an improved suspension mechanism between the vehicle frame and the axle mechanism adapted substantially at all times to maintain the traction wheels in contact with the ground during the operation of the vehicle.

A further object of the invention is to so construct the component parts of the axle mechanism or mechanisms, including the power transmitting devices and steering elements, between the wheels and vehicle frame, that vehicle constructions adapted for varying operating conditions and requirements, by the substitution or interchangeability of parts, can be readily provided.

Other objects of the invention will be apparent to those skilled in the art to which our invention relates from the following description, taken in connection with the accompanying drawings.

In the drawings, Figure 1 is a plan view of a motor vehicle embodying our invention.

Fig. 3 is a horizontal sectional view (partly in section and partly broken away) showing the frame, axle mechanism and motor for the vehicle in plan.

Fig. 4 is a section on the line 4—4 of Fig. 3.

Fig. 5 is a section on the line 5—5 of Fig. 3.

Fig. 6 is a fragmentary plan view, enlarged of the axle mechanism, suspension mechanism and motor shown in Figs. 3 and 4.

Fig. 7 is a section on the line 7—7 of Fig. 6.

Fig. 8 is a rear end view of the motor vehicle, partly in section, on the line 8—8 of Fig. 6.

Fig. 10 is a plan view of a motor vehicle showing another modification of the invention, wherein is provided four wheels, two of which are driving and steering wheels and the other two of which are fixed or non-steerable.

Fig. 13 is a plan view of the frame, axle mechanisms, suspension mechanisms and motor of a vehicle embodying another modified form of our invention, wherein the vehicle is provided with four wheels, two of which are driving wheels and the other two of which are steering wheels.

Fig. 14 is a longitudinal sectional view of the motor vehicle shown in Fig. 13.

Fig. 16 is a longitudinal sectional view of a motor vehicle, showing a further modification of the invention, wherein are provided four wheels, two of which are driven and all four of which are steering wheels.

Fig. 17 is a view substantially like that shown in Fig. 16, but embodying further modification of the invention.

Fig. 18 is a plan view similar to Figs. 10 and 13, but showing a further modification of the invention.

Fig. 20 is a longitudinal sectional view of the vehicle shown in Fig. 18.

Figs. 21 and 22 are views corresponding respectively to Figs. 18 and 20, but showing a further modification of the invention.

Fig. 23 is a view corresponding to Fig. 22 illustrating a further modification of the invention.

Figs. 24 and 25 are plan and sectional views of a vehicle showing a still further modified form of construction embodying our invention.

Figure 1:
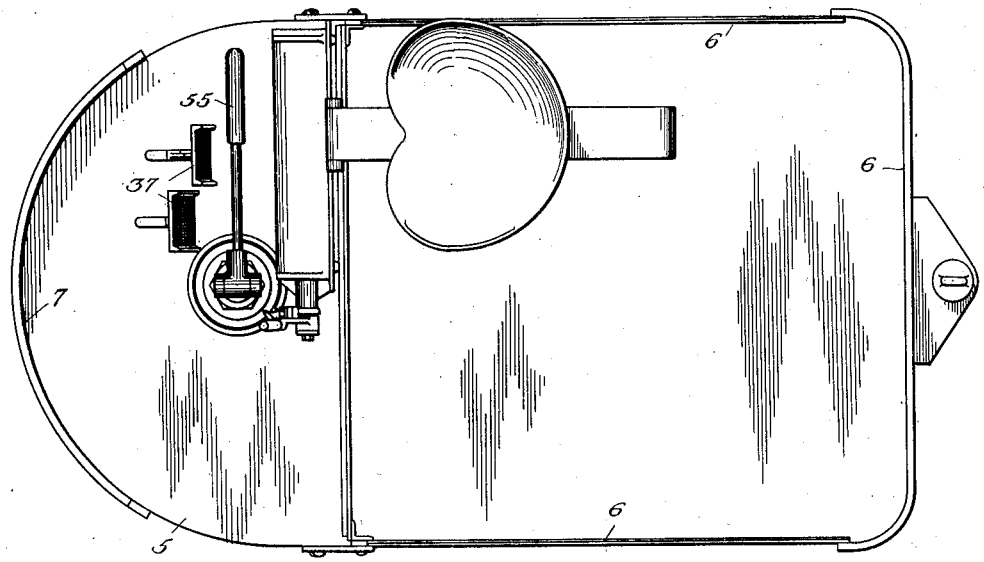
Figure 2:
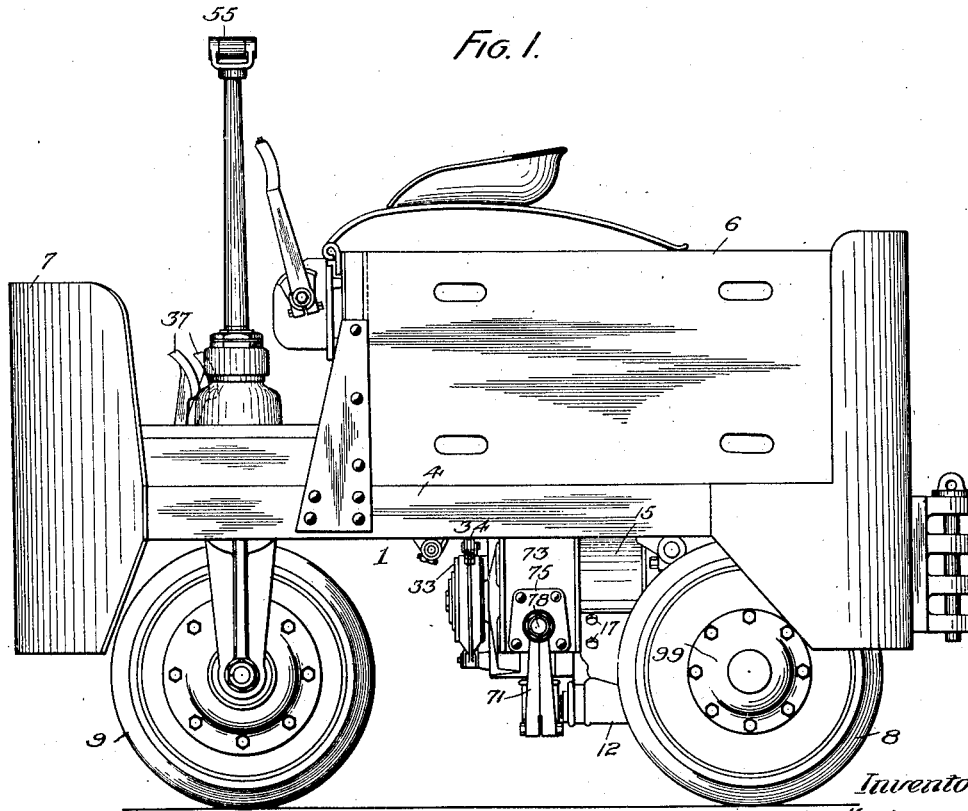
Fig. 2 is a side elevation of the motor vehicle shown in Fig. 1.
Figure 9:
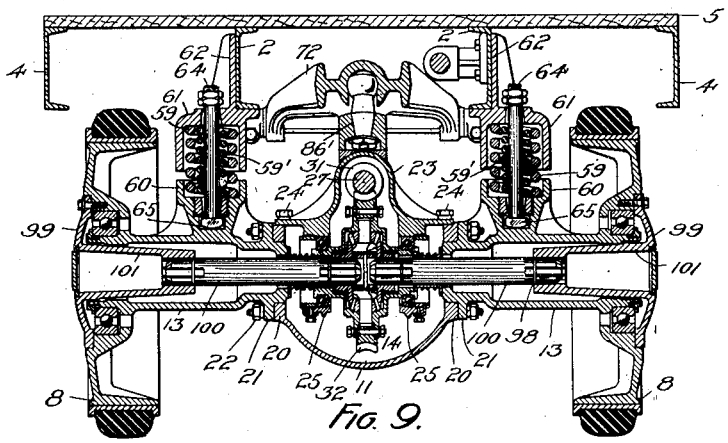
Fig. 9 is a section on the line 9—9 of Fig. 6.

Referring particularly to Figs. 1 to 9, inclusive, 1 indicates the frame of the vehicle. The frame 1 preferably comprises a pair of main longitudinal members 2, 2, a cross member 3, and connected side members 4, which may extend continuously around the car and form the contour of the frame proper.

No claim is made herein to the frame, or the elements thereof, as the same constitutes the subject-matter of a separate application filed by Edward H. Remde (see Letters Patent No. 1,554,167).

The frame 1 may be provided with a platform 5 (see Fig. 8) on which the batteries may be supported, when the vehicle is operated electrically, side and rear end plates 6, and dash 7, if desired.

In the form of construction now being described, I provide two driving or traction wheels 8 and one steering wheel 9, but our invention may be applied to other forms of construction, examples of which will be later referred to.

10 indicates as an entirety an axle mechanism for the wheels. The axle mechanism 10 comprises a center section 11, having an inwardly extending tail member 12, and outer or end sections 13. When the wheels 8 are to be driven, as shown in the form of construction now being described, we prefer to use a center section 11 capable of housing and supporting a differential mechanism 14 and rigidly supporting a motor, indicated as an entirety at 15, on the tail member 12 of the center section 11. When so constructed, the tail member 12 is shaped to form a cradle for the motor casing 16, bolts 17 being provided to secure it thereto. The housing sections 13 are provided at their outer ends with suitable anti-friction bearings on which the traction wheels 8 are rotatably supported. The opposite ends of the center section 11 and the inner ends of the outer sections 13 are flanged, as shown at 20, 21, respectively, and rigidly secured together by suitable bolts 22, which permit ready detachment and assembly of the sections, when desired. 23 indicates a cover member for the central housing section 11. The cover member 23 is provided with side walls and front and rear walls correlated to engage the side walls of the section 11 and be secured thereto by bolts 24. The side walls of the cover member 23 are provided with depending blocks 25, in which are mounted suitable bearings to support the differential mechanism 14 in a well-known manner. The front and rear walls of the cover member 23 are formed with suitable openings, which serve as seats for anti-friction bearings 26.

27 indicates a driving or propeller shaft mounted in the bearings 26. One end of the shaft 27 is connected in a suitable manner through a suitable universal joint with the adjacent end of the motor shaft 28; its opposite end preferably extends beyond its supporting bearings 26 and the rear wall of the cover member 23 and carries a brake shoe engaging wheel 29 of a brake mechanism 30.

31. Indicates a worm provided on the propeller shaft 27 and meshing with the main driving element 32 of the differential mechanism 14. The motor shaft 28 preferably extends through and beyond the inner end of the motor 15 or motor casing 16 and carries a brake shoe engaging wheel 33 of a brake mechanism 34. The brake shoes for the wheels 29 and 33 are operated through suitable connections 35, 36, respectively, by pedals 37 in a well-known manner. As will be understood, each pedal 37 constitutes an operating device and each brake wheel and its coacting shoe or shoes, or band, constitute the element that controls the motor shaft or propeller shaft and through it the wheels of the vehicle to stop it or hold it against movement.

38 indicates a bracket for supporting certain elements of the brake mechanism 30. The bracket 38 preferably comprises a plate formed with an opening 39 through which the shaft 27 extends. The bracket or plate 38 is connected to the cover member 23 by bolts 40. The upper end of the bracket 38 is preferably turned inwardly and formed with a screw-threaded opening, in which is mounted a bolt 41 adapted to serve as a shaft for a bell crank 42, one of the elements of the brake operating connections 35; the lower end of the bracket 38 is formed with an opening 43, in which is mounted a pin 44, that forms a pivotal support for corresponding ends of the brake shoes of the brake mechanism 30. The brake operating connections 36 are substantially similar to the connections 35, except that the bell crank lever 45 of the former connections is mounted on a stud shaft 46, which, by preference, is secured in any well-known manner to the motor casing 16.

The steering wheel 9 is preferably provided with a pair of shaft sections 47, 48, correlated to support between them a bearing 49 on which the wheel rotates. One of the shaft sections (48) is mounted on a shaft or pin 50 supported at its opposite ends in openings formed in the forks 51 of a steering column 52. Nuts 53 are provided for securing the forks 51 to the shaft 50 and through the former clamping the shaft sections 47, 48, in co-operative relationship with the bearing 49 between them. The steering column 52 projects through an opening formed in a supplemental frame 54, which is secured between the frame members 2 of the vehicle (see Fig. 3). The steering column carries at its upper end a pivoted handle 55 which may be disposed horizontally and operated in a well-known manner. The column 52 preferably includes a pair of telescoping members 56, 57, the outer one of which is connected to the supplemental frame 54. 58 indicates a coiled compression spring surrounding the inner member 56 and disposed between collars provided on said telescoping members so as to operate as a spring for the front end of the vehicle frame 1.

59 indicates springs interposed between the axle mechanism 10 and opposite sides of the frame 1. The springs 59 are preferably coiled springs mounted in cup members 60, 61, carried respectively by the axle sections 13 and the frame 1. The cup members 60 are preferably formed integrally with the sections 13, while the cup members 61 are preferably formed integrally with plates 62 rigidly secured in any desired manner to the adjacent frame members 2. We preferably provide a plurality of springs in each pair of cup members 60, 61, as shown at 59'. The spring 59' is preferably a coiled spring and arranged within the adjacent spring 59. It is preferably somewhat stronger than the spring 59 and is adapted to supplement the spring 59 in a well-known manner.

63 indicates means for preventing undue rebound of the frame 1 relative to the axle mechanism 10. The means 63 preferably comprise bolts 64, having heads 65 anchored in the axle sections 13 and extending axially of the springs 59 through openings 66 formed in the cup members 61, and nuts 67 secured to the free ends of the bolts 64 and arranged to engage the upper faces of the cup members. The bolts 64 are of a length to permit proper functioning of the springs, the nuts 67 being spaced from the cup member 61 on the bolts a sufficient distance to permit operation of the springs 59, but to prevent undue rebounding. The bolt heads 65 are preferably seated in recesses 68 formed in the axle sections 13, as shown in Fig. 8. The walls of each recess 68 are provided with screw-threads to receive a collar 69 which engages the underside of the adjacent bolt head to secure it in the adjacent recess 68. The faces of the bolt heads 65 are preferably rounded to permit them to readily rock slightly incident to relative movement between the axle mechanism 10 and frame members 2; for the same reasons the openings in the collar 69 and the cup member 61 are enlarged, as shown in the drawings.

70 indicates as an entirety a suspension mechanism, interposed between the axle mechanism 10 and the frame 1 of the vehicle, which is adapted to maintain (1) these elements against relative lateral movements or thrusts, (2) the steering and brake controlling members and the connections therewith for the steering gear and brakes, respectively, in operative relationship during operation of the vehicle, and (3) the supporting and traction wheels in contact with the ground substantially at all times, and (4) when the axle has associated with it power transmitting devices, alignment between the latter and the motor, while permitting all necessary relative movement between the axle mechanism and the vehicle frame 1 incident to the operation of the vehicle. The suspension mechanism 70 comprises a pair of swingable members 71, 72, each of which is pivotally connected to or fulcrumed on the frame 1 and the adjacent axle mechanism 10; as shown, one member (71) is connected to a laterally extending member (to be later described) rigidly connected with the axle mechanism, preferably at one end thereof, and the other member (72) is connected to or near the other end of the axle mechanism, the former being normally arranged in a substantially vertical position and constituting a torque member and the latter being normally arranged in a substantially horizontal position and constituting a compensating member and radius rods and the driving connection between the frame and axle, where the latter is driven. This construction and arrangement permits the frame 1 and the axle mechanism to move relative to each other, about the pivotal connections for the member 72, and the axle mechanism and frame 1 to move longitudinally relative to each other, about the pivotal connections for the member 71. As each of the members 71, 72, is pivotally connected to the frame and axle mechanism, it will be seen that the axle mechanism 10 is guided and controlled and the axis upon which the adjacent wheels are mounted, is held in an operative relationship to the frame at all times, as either of these relative movements or resultants thereof take place. Each of the swingable members 71, 72, consists of a substantially V or U-shaped element pivoted at its free ends to the longitudinal members 2 of the frame 1 and at its center portion to the center section 11 of the axle mechanism 10. 73, 74, indicate pairs of supports to which the free ends of the swingable members 71, 72, are pivoted, respectively. The supports 73, 74, are carried by the frame members 2, being preferably rigidly secured to and depending therefrom a suitable distance, as shown. The pivoting devices between the free ends of the swingable members 71, 72, and the adjacent supports 73, 74, may be of any suitable construction. For the swingable member 71 these pivoting devices comprise supplemental plates 75 rigidly secured to the adjacent depending plates 73 and formed with aligned openings 76 to receive bushings 77 which serve as bearings for shafts 78. The shafts 78 preferably comprise bolts the inner or free ends of which screw into screw-threaded openings in the free ends of the swingable member 71 and are locked therein by clamp screws 79. For the swingable member 72, these pivoting devices comprise a cross shaft 80 mounted at its opposite ends in split collars 81 the walls of which are clamped around the shaft by bolts and nuts, indicated at 82. The collars 81 are preferably formed integral with the adjacent supports 74. The free ends of the swingable member 72 are provided with knuckles 83 through which the cross shaft 80 extends. The knuckles 83 are preferably provided with suitable bushings which permit them to freely rock on the shaft 80. The opposite ends of the shaft 80 may, if desired, be extended and provided with screw threads to receive nuts 84 which prevent endwise movement of the shaft 80 in the collars 81.

85, 85, indicate the pivotal connection between the center portions of the swingable members 71, 72, and the axle mechanism 10. The connections 85 are preferably similar in construction except that where the axle mechanism includes power transmitting mechanism 14, the cover member 23 is provided with a removable plate 86 which is formed with an opening 86' and to receive and support one of the adjacent pivoting elements. Being similar in construction, we will describe only one of these pivoting devices 85, namely those between the swingable member 71 and the tail member 12. Of these pivoting devices, 87 indicates a cavity formed in the swingable member 71 at its center portion, which is preferably enlarged to provide ample space for the pivot elements. The cavity 87 is open on its outer side, and that side wall adjacent the axle mechanism 10 is formed with an opening 88. 89, 90, indicate spaced bearing elements removably mounted in the cavity 87. The opposing walls of the bearing elements 89, 90, are of concave form to provide a seat for a sphere or ball 91 mounted on the free end of a pin 92. The stem of the pin 92 is preferably of conical shape to fit a similarly shaped opening 93 formed in a lug 94 integrally connected with the tail member 12. The pin 92 is preferably held in the opening 93 by a clamping nut 95. The bearing element 90 preferably screw threads into the cavity 87 and through its engagement with the ball 91, maintains the bearing element 89 against the bottom wall of the cavity. The bearing element 90 may be locked in adjusted position by a suitable device 96. The plate 86 may be removably secured at its front and rear ends to the cover member 23 by bolts or cap screws 97.

It will be understood from the construction just described that a ball and socket joint is provided between each swingable member 71, 72, and the axle mechanism to provide for its pivotal movement in any direction, so that in addition to the already referred to compensating movements and relative movements between the frame and axle mechanism, the latter may swing about such joints, while being maintained in operative relation to the frame, to enable the wheels to maintain traction with the surface of the ground, at all times.

From the foregoing description it will also be seen that the swingable members 71, 72, are so correlated that one serves as a radius rod and the other as a torque rod and at the same time permit relative vertical and longitudinal movements incident to the operation of the vehicle between the axle mechanism and the vehicle frame, while preventing relative lateral movements therebetween.

98 indicates the live axle sections connected at their inner ends in a well-known manner to the differential mechanism 14 and extending therefrom through the axle sections 11 and 13, being connected at their outer ends in a well-known manner to caps or hub plates 99 fixed to the outer sides of the wheels 8. Each of the axle sections 98 preferably comprises two members 100, 101, detachably connected at adjoining ends. By preference the axle member 101 consists of an inturned element integrally connected with the cap plate 99.

Figure 11:
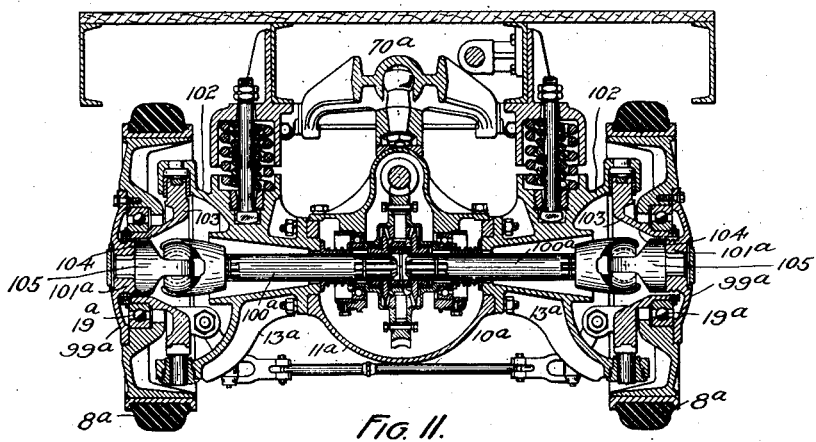
Fig. 11 is a section on the line 11—11 of Fig. 10.
Figure 12:
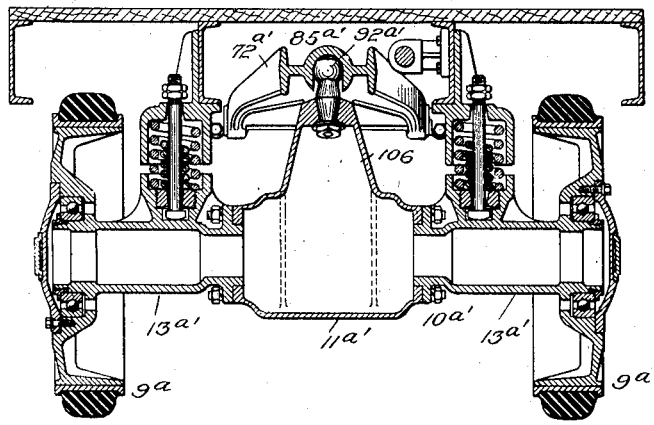
Fig. 12 is a section on the line 12—12 of Fig. 10.

In Figs. 10, 11 and 12 there is shown a modified form of vehicle construction, in which we provide (1) four wheels, 8ª, 9ª, for the vehicle frame 1ª, two of which wheels (8ª) being combined traction and steering wheels and the remaining two wheels (9ª) being non-driven and non-steerable, and (2) our improved suspension mechanism in correlation with each of the axle mechanisms for these wheels. In these views, 10ª indicates an axle mechanism for the wheels 8ª. The axle mechanism 10ª comprises a center section 11ª, which corresponds in construction to the center section 11 in the form of construction shown in Figs. 1 to 9, inclusive, and outer sections 13ª. In this form of construction, each outer member 13ª is provided with arms 102, which serve as steering knuckles for the inturned arms 103 of an intermediate annular member 104. The outer end of each annular member 104 is provided with suitable bearings 19ª on which the adjacent wheels 8ª rotate. The wheel supporting end of each annular member 104 is reduced to a size corresponding to the outer ends of the sections 13, so as to receive and support the adjacent wheel 8ª, thus permitting the use of wheels identical in size and construction to those shown in Fig. 1. 99ª indicates a cap or hub plate for each wheel 8ª, removably secured thereto. The inturned element 101ª of the plate 99ª is shorter than the element 101 (see Fig. 9) to permit the interposition between it and the adjacent end of the live axle section 100ª of a universal joint 105, which insures driving and steering of the wheel 8ª in a well-known way.

70ª indicates as an entirety the suspension mechanism interposed between the axle mechanism 10ª and frame 1ª. The suspension mechanism 70ª being similar in construction to the suspension mechanism 70 further description thereof will not be necessary.

10ª′ indicates the axle mechanism for the wheels 9ª. The axle mechanism 10ª′ comprises a center section 11ª′ having a tail member 12ª′ and outer or end sections 13ª′. The outer or end sections 13ª′ are similar in size and construction to the corresponding parts of the axle mechanisms for the wheels 8 and 8ª. As shown, the wheels 9ª are non-driving wheels; accordingly the axle mechanism 10ª′ does not include any power transmitting mechanism. When our improved suspension mechanism is embodied in or correlated with this type of axle or axle mechanism, the center section thereof is provided (1) with an up-standing member 106 which serves as a suitable support for the pivoting devices 85ª′ between the adjacent swingable member 72ª′ and the axle mechanism 10ª′ and (2) with a tail member 12ª′ preferably of tapered form since it is not necessary for it to receive and support a motor. The up-standing member 106 and tail member 12ª′ extend upwardly and rearwardly, respectively, far enough to support the pins 92ª′ for correlation with the pivoting elements of the swingable members 71ª′, 72ª′, thus permitting the substitution of a center section 11ª′, where the axle is to be a non-driving one, without the substitution of any other element of the axle mechanism 10ª′ or suspension mechanism 70ª′. To pivotally support the free ends of the vertically arranged swingable member 71ª′, I provide depending supports 73ª′, which are similar to corresponding parts already described in connection with the form of construction shown in Figs. 1 to 9, inclusive.

107 indicates as an entirety a steering gear having elements 108, 108, connected in a well-known manner to the inturned arms 103 of the wheels 8ª. The steering gear 107 is preferably connected through a rock shaft 109 in any desired manner to a steering element (not shown) arranged in proper position for the operative to operate.

Figure 15:
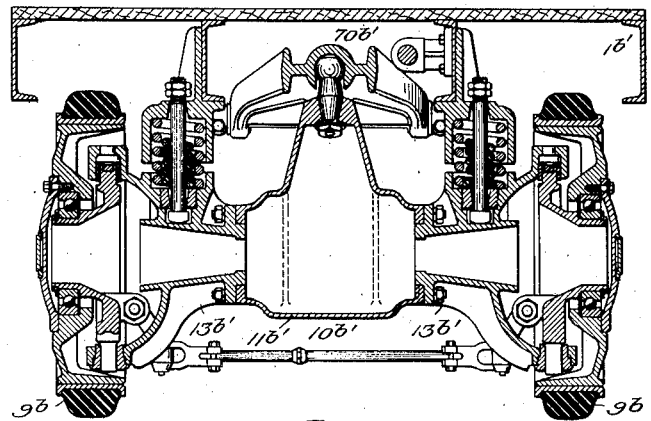
Fig. 15 is a section on the line 15—15 of Figs. 13 and 14.

When it is desired to use non-steerable traction wheels and to steer the vehicle by the supporting wheels, we modify the construction as shown in Figs. 13, 14 and 15. In these views, 1ᵇ indicates the vehicle frame; 8ᵇ indicates the traction wheels; 9ᵇ indicates the supporting and steering wheels; 10ᵇ indicates the axle mechanism for the wheels 8ᵇ; 15ᵇ indicates the motor, the shaft of which is connected to power transmitting mechanism (not shown) associated with the axle mechanism 10ᵇ; 10ᵇ′ indicates the axle mechanism for the wheels 9ᵇ, and 70ᵇ, 70ᵇ′, indicate the suspension mechanisms between the frame 1ᵇ and axle mechanisms 10ᵇ, 10ᵇ′, respectively. As shown, the axle mechanism 10ᵇ, motor 15ᵇ, and suspension mechanism 70ᵇ and their associated elements, are respectively identical to the axle mechanism 10, motor 15 and suspension mechanism 70, and their associated elements, described in connection with the vehicle construction shown in Figs. 1 to 9, inclusive.

Of the axle mechanism 10ᵇ′, 11ᵇ′, indicates the center section and 13ᵇ′ the outer or end sections. Referring to Fig. 15, it will be seen that the elements correlated in this form of axle construction including the wheels 9ᵇ are similar to those used and correlated, respectively, in the axle mechanism 10ª, in Figs. 10 and 11, except that in lieu of the center section 11ª thereof I substitute a center section 11ᵇ′ which is similar to the center section 11ª′ used and correlated in the axle mechanism 10ª′ (Figs. 10 and 12), since the wheels 9ᵇ mounted on or associated with axle mechanism 10ᵇ′ are not traction wheels.

When it is desired to provide steerable traction wheels and also steerable supporting wheels, (viz, a four-wheel steer vehicle), we modify the construction as shown in Figs. 16 and 17. In these views, 1ᶜ indicates the vehicle frame; 8ᶜ indicates the traction wheels; 9ᶜ indicates the supporting wheels; 10ᶜ indicates the axle mechanism for the wheels 8ᶜ; 15ᶜ indicates the motor, the shaft of which is connected through the power transmitting mechanism (not shown) to the live axle sections (one being shown at 98ᶜ) associated with the axle mechanism 10ᶜ; 10ᶜ′ indicates the axle mechanism for the wheels 9ᶜ; and 70ᶜ, 70ᶜ′, indicate the suspension mechanisms between the frame 1ᶜ and axle mechanisms 10ᶜ, 10ᶜ′, respectively. As shown, the axle mechanism 10ᶜ and motor 15ᶜ, and their associated elements, are respectively indentical to the axle mechanism 10ª, motor 15ª and their associated elements described in connection with the vehicle construction shown in Figs. 10 and 11; and the axle mechanism 10ᶜ′, suspension mechanism 70ᶜ′ and their associated elements, as shown in Fig. 16, are respectively identical to the axle mechanism 10ᵇ′ and its associated elements shown in Figs. 13, 14 and 15; accordingly, further descriptions of these mechanisms and elements will not be required.

In the construction now being described, we may further modify the construction by reversing the pivotal connections of the substantially horizontal swingable member 72ᶜ of the suspension mechanism 70ᶜ so that the pivotal devices 85ᶜ therefor are arranged between the rock shaft 80ᶜ and the motor 15ᶜ. For this purpose I provide a removable plate 86ᶜ which is formed at its front end with an opening to receive and support the pivoting element of the adjacent pivoting devices 85ᶜ. As shown, the plate 86ᶜ is suitably constructed for attachment to the cover member 23ᶜ. We also further modify the construction of the suspension mechanism 70ᶜ′, as shown in Fig. 17, between the frame 1ᶜ and axle mechanism 10ᶜ′, by reversing the pivoting devices for the swingable member 72ᶜ′, as compared to the arrangement of similar devices shown in Figs. 10, 12, 13, 14 and 16. In this latter form of construction I provide a center section 11ᶜ″, which is similar in construction to the center section 11ᶜ′ (Fig. 16), except that the wall in which the conical opening 94ᶜ′ is formed is arranged to incline the opening outwardly instead of inwardly.

Figure 19:
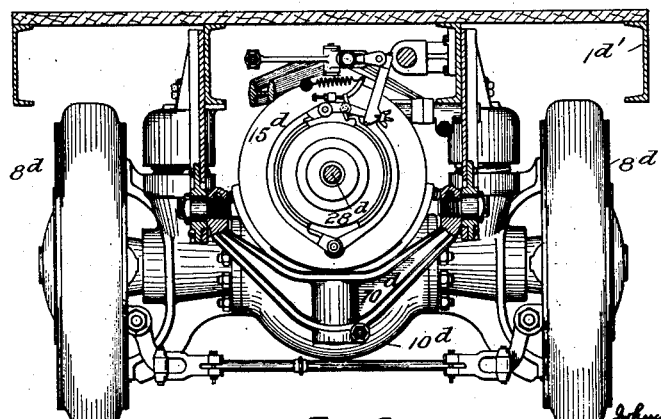
Fig. 19 is a section on the line 19—19 of Fig. 18.

Figs. 18, 19 and 20 illustrate a further modified form of vehicle construction. In these views, 1ᵈ indicates the vehicle frame; 8ᵈ, 9ᵈ, indicate four wheels all of which are combined traction and steering wheels; 10ᵈ indicates the suspension mechanism between the frame 1ᵈ and axle mechanism 70ᵈ, these mechanisms and their associated elements being identical in construction and correlation to similar mechanisms and their associated elements, respectively, shown in Figs. 10 and 11. 15ᵈ indicates a motor associated with the axle mechanism 10ᵈ and secured to the tail member 12ᵈ thereof. 28ᵈ indicates the motor shaft, which is extended at its inner end as shown at 110 for a purpose to be later set forth. 10ᵈ′ indicates the axle mechanism for the wheels 9ᵈ. The axle mechanism 10ᵈ′ comprises a center section 11ᵈ′ and outer or end sections 13ᵈ′, 13ᵈ′, which are similar in construction to similar sections in the axle mechanism 10ᵈ, except that the tail member 12ᵈ′ thereof is substantially like the tail members 10ᵇ′ (Figs. 13 and 14) and 10ᶜ′ (Figs. 16 and 17), since in this form of construction there is no motor associated with the axle mechanism 10′. 23ᵈ′ indicates a cover member for the center section 11ᵈ′ similar in construction to the cover member 23, and arranged to support a propeller shaft 27ᵈ′. The propeller shaft 27ᵈ′ at its inner end is provided with a universal joint 111, through which it is connected to the shaft 110.

Figs. 21 and 22 illustrate a further modified form of vehicle construction in which the swingable members 72ᵉ, 72ᵉ′, of the suspension mechanisms 70ᵉ, 70ᵉ′, are reversed as compared to their arrangement in Figs. 18 and 20.

Fig. 23 shows still another form of construction like that shown in Figs. 21 and 22, except that the swingable member 72ᶠ of the suspension mechanism 70ᶠ between the frame 1ᶠ and axle mechanism 10ᶠ is reversed as compared to the arrangement of this element shown in Figs. 21 and 22; the arrangement shown in Fig. 23 corresponding to that shown in Figs. 3, 4, 6, 7, 8, 9, 10, 11, 13, 14, 18 and 20.

In Figs. 24 and 25 we have illustrated a still further modified form of vehicle construction. Referring to these views, 1ᵍ indicates the vehicle frame; 8ᵍ indicates the traction wheels, which may, as shown, be steerable; 9ᵍ indicates the supporting wheels which are preferably also steerable; 10ᵍ indicates the axle mechanism for the wheels 8ᵍ; 10ᵍ′ indicates the axle mechanism for the wheels 9ᵍ. 70ᵍ, 70ᵍ′ indicate the suspension mechanisms between the frame 1ᵍ and the axle mechanisms 10ᵍ, 10ᵍ′, respectively. The axle mechanism 10ᵍ is similar in construction to the axle mechanism indicated at 10ᵈ′ in Figs. 18 and 20, whereas the axle mechanism 10ᵍ′ is similar in construction to the axle mechanism 10ᵇ′ (Figs. 13, 14) and 10ᶜ′ (Figs. 16, 17). 15ᵍ indicates a motor which is preferably rigidly supported substantially midway between the ends of the vehicle by a U-shaped member 112 fixed at its upper free ends to the frame members 2ᵍ. The shaft 28ᵍ of the motor 15ᵍ is extended, as shown at 113 and connected through a universal joint 114 with the propeller shaft 27ᵍ.

In this last described form of construction, it will be noted that the axle mechanisms for both sets of wheels may be connected and correlated with the vehicle frame through suspension mechanisms independently of any unitary connection therewith (either or both) of the motor which transmits power therethrough to the wheels. Accordingly, it will be seen that our invention is applicable to constructions in which the motor is rigidly connected to the vehicle frame instead of either or both axle mechanisms, and that the suspension mechanism between the frame and adjacent axle mechanism, either or both, will permit relative movement between them, while maintaining driving connection through the power transmitting devices mounted in or associated with the axle mechanism to the traction wheels.

From the foregoing description it will be noted that the substantially horizontal swingable members of the suspension mechanisms (either or both) may be arranged so that their pivotal connections with the axle mechanism is or are in front or rear of their pivotal connections with the vehicle frame, so long as they permit the axle mechanism and frame to move vertically, or substantially so; and when arranged in either position they co-act with the substantially vertical swingable members to maintain the axle mechanism in operative relation to the vehicle frame during relative movement between them.

In assembling motor vehicles embodying our invention it will be noted that the various elements and component parts are constructed for interchangeability and attachment and that by the substitution of a minimum number of elements varying types of vehicles (viz, two wheel drive, two or four wheel steer, two or four wheel drive and combinations of steering and driving wheels) to meet varying conditions and requirements of service can be provided. The arrangement is such that after a motor vehicle is once assembled, it can be modified from one type to another quickly and economically; and the elements of one axle mechanism of a vehicle can be interchanged with elements of the other axle mechanism of the vehicle to form a front or rear wheel drive, or a front or rear wheel steer.

By our invention we are enabled to provide a vehicle having a suspension mechanism adapted to maintain the longitudinal axis of the axle driving sections in a substantially neutral position while permitting relative movement between the axle mechanism and the vehicle frame; not only does this maintain the brake and steering connections and their respective operating members in operative relationship, but it also maintains the power transmitting devices associated with either or both axle mechanisms in alignment with the motor. As shown in the drawings, we are enabled to mount the motor on one of the axle mechanisms of the vehicle or directly on the frame thereof and in either form of construction connect it with the power transmitting devices of the axle mechanism which carries the traction wheels or with the power transmitting devices of both axle mechanisms where the vehicle is of the four wheel drive type.

From the foregoing description, it will be seen that our invention may be applied to axle mechanisms of any type, either non-steer non-drive type, driven non-steer type, steering non-drive type, or both steerable and driven type.

To those skilled in the art of making mechanisms of the class described, many alterations in construction and widely differing embodiments and applications of our invention will suggest themselves, without departing from the spirit and scope thereof. Our disclosures and the description herein are purely illustrative and are not intended to be in any sense limiting.

What we claim is:

1. In apparatus of the class described, the combination of a frame, an axle mechanism having wheels for supporting said frame, and a suspension mechanism comprising a pair of compensating members, each mounted on said frame to swing in a direction longitudinally thereof only, and having spaced pivotal connections with said axle mechanism in a longitudinal plane substantially midway between said wheels.

2. In apparatus of the class described, the combination of a frame, an axle mechanism having wheels for supporting said frame, and a suspension mechanism comprising a pair of devices disposed in spaced relation longitudinally of said frame and each pivotally mounted on said frame to swing in the plane thereof only and pivotally connected to said axle mechanism to permit oscillation of the latter about the axis cutting the pivots of said devices while preventing movement of said axle mechanism laterally.

3. In a vehicle, the combination of a frame, wheels for supporting said frame, an axle for certain of said wheels, a torque member fulcrumed on said frame and connected to said axle by a universal joint at a point substantially midway between the wheels on said axle, and a compensating member normally disposed substantially horizontally and fulcrumed on said frame and connected by a universal joint to said axle in spaced relation to the universal joint connection for said torque member but in a plane coincident thereto extending longitudinally of said frame.

4. In a vehicle, the combination of a frame, wheels for supporting said frame, an axle for certain of said wheels, a driving mechanism associated with said axle and connected to the wheels thereon, a torque member fulcrumed on said frame and connected to said axle by a universal joint at a point substantially midway between the wheels thereon, and a compensating member normally disposed substantially horizontally and fulcrumed on said frame and connected by a universal joint to said axle in spaced relation to the universal joint connection for said torque member and in a plane coincident thereto extending longitudinally of said frame, said compensating member serving to transmit the tractive effort of the wheels driven by said driving mechanism from the axle for said wheels to said frame.

5. In apparatus of the class described, the combination of a frame, an axle mechanism having wheels for supporting said frame, an operating device mounted on said frame, a controlling element mounted on said axle mechanism, connections between said device and said element for operating the latter, and suspension elements in spaced longitudinal relation having pivotal connections with said frame and axle mechanism and cooperating to prevent lateral movement of the latter relative to said frame and for maintaining said connections in operative relationship during relative movements between said frame and axle mechanism incident to uneven surfaces over which said wheels travel.

6. In apparatus of the class described, the combination of a frame, wheels therefor, an axle mechanism for two of said wheels, a pair of compensating members spaced from each other longitudinally of said frame and each pivotally connected to the latter to swing in its longitudinal plane only, and a universal joint connection between each said member and said axle mechanism.

7. In apparatus of the class described, the combination of a frame, wheels, an axle mechanism for two of said wheels, a pair of spaced compensating members each pivotally connected to said frame and axle mechanism, means for driving certain of said wheels, springs interposed between said axle mechanism and said frame, and separate means permitting said springs to function but connecting said axle mechanism and frame together.

8. In apparatus of the class described, the combination of a frame, supporting wheels therefor, an axle mechanism for certain of said wheels, a pair of members spaced longitudinally of said frame for pivotally connecting said axle mechanism to said frame, one of said members being pivoted at its opposite ends to said frame, and a universal joint connection between said axle mechanism and the last mentioned member disposed thereon and at a point intermediate its opposite ends.

9. In apparatus of the class described, the combination of a frame, an axle mechanism having wheels, a pair of spaced ball-and-socket devices disposed in a plane extending longitudinally of said frame and about which said axle mechanism may swing, and means for supporting said devices to move in a common plane.

10. In apparatus of the class described, the combination of a frame, an axle mechanism, wheels mounted on said axle mechanism, and a U-member pivoted at its free ends to said frame and connected by a universal joint at its center portion to said axle mechanism.

11. In apparatus of the class described, the combination of a frame, an axle mechanism, wheels mounted on said axle mechanism, a U-member pivoted at its free ends to said frame and pivoted at its center portion to said axle mechanism, and a separate U-member pivoted at its free ends to said frame and pivoted at its center portion to said axle mechanism at a point spaced from the connection of said first mentioned U-member therewith.

12. In apparatus of the class described, the combination of a frame, an axle mechanism, wheels mounted on said axle mechanism, a U-member pivoted at its free ends to said frame and pivoted at its center portion to said axle mechanism, and a separate U-member pivoted at its free ends to said frame and pivoted at its center portion to a laterally projecting member carried by said axle mechanism.

13. In apparatus of the class described, the combination of a frame, an axle mechanism, wheels mounted on said axle mechanism, a U-member pivoted at its free ends to said frame and pivoted at its center portion to said axle mechanism, and a separate U-member pivoted at its free ends to said frame and connected by a universal joint at its center portion to said axle mechanism.

14. In apparatus of the class described, the combination of a frame, wheels for supporting said frame, an axle mechanism for two of said wheels, and a pair of swingable members pivoted at their free ends to said frame and a universal joint between the center portion of each of said members and said axle mechanism, said universal joints being spaced from each other.

15. In apparatus of the class described, the combination of a frame, supporting wheels therefor, an axle mechanism, a torque member pivotally connected to said frame and one end of said axle mechanism, and a separate member pivotally connected to said frame and the other end of said axle mechanism and disposed at an angle to said torque member.

16. In apparatus of the class described, the combination of a frame, supporting wheels therefor, an axle mechanism, a torque member pivotally connected to said frame and one end of said axle mechanism and a separate member pivotally connected to said frame and the other end of said axle mechanism, the pivotal connection of said separate member with said axle mechanism being arranged in the plane of but above the pivotal connection of said torque member with said axle mechanism.

17. In apparatus of the class described, the combination of a frame, an axle mechanism, wheels mounted on said axle mechanism, a pair of U-members each pivoted at its free ends to said frame, and means for pivotally connecting one of said members to said axle mechanism at one side of the axis of said wheels and the other of said members to said axle mechanism at the other side of said axis.

18. In apparatus of the character described, the combination of a frame, an axle mechanism, wheels mounted on said axle mechanism, a pair of U-members, each pivoted at their free ends to said frame, and means for pivotally connecting the center portions of said members to said axle mechanism on a longitudinal line that is substantially midway between said wheels.

19. In apparatus of the character described, the combination of a frame, axle mechanisms, pairs of wheels mounted on said axle mechanisms, and a pair of U-members for each axle mechanism, each pivoted at its free ends to said frame and pivoted at its center portion to one of said axle mechanisms.

20. In apparatus of the class described, the combination of a frame, an axle mechanism having a tail member, wheels mounted at the opposite ends of said axle mechanism, a U-member pivoted at its free ends to said frame and at its center portion to said axle mechanism, and means pivotally connecting said frame and tail member together.

21. In apparatus of the class described, the combination of a frame, an axle mechanism having a tail member, wheels mounted at the opposite ends of said axle mechanism, a U-member pivoted at its free ends to said frame and at its center portion to said tail member, and a separate U-shaped member pivoted at its free ends to said frame and at its center portion to said axle mechanism at a point spaced from said tail member.

22. In apparatus of the class described, the combination of a frame, an axle mechanism having a tail member, power transmitting devices operatively connected to the axle of said axle mechanism, wheels mounted at the opposite ends of said axle mechanism, means pivotally connecting said frame and tail member together, and a U-member pivoted at its free ends to said frame and at its center portion to said axle mechanism at a point spaced from said tail member.

23. In apparatus of the class described, the combination of a frame, an axle mechanism having a tail member, power transmitting devices associated with said axle mechanism, wheels mounted at the opposite ends of said axle mechanism, a motor connected to said power transmitting devices, means pivotally connecting said frame and tail member together, and a U-shaped member pivoted at its free ends to said frame and at its center portion to said axle mechanism at a point spaced from said tail member.

24. In apparatus of the class described, the combination of a frame, an axle mechanism having a tail member, power transmitting devices associated with said axle mechanism, wheels mounted at the opposite ends of said axle mechanism, a motor mounted on said tail member and connected to said power transmitting devices, a U-shaped member pivoted at its free ends to said frame and at its center portion to said tail member, and a separate U-shaped member pivotally connected at its free ends to said frame and at its center portion to said axle mechanism at a point spaced from said tail member.

25. In apparatus of the class described, the combination of a frame, axle mechanisms, power transmitting devices associated with one of said axle mechanisms, a pair of wheels mounted at the opposite ends of each of said axle mechanisms, a motor connected to said power transmitting devices, a pair of compensating members, each pivoted at its free ends to said frame and at its center portion to one of said axle mechanisms, the pivot connections of said members with the axle mechanism being spaced from each other.

26. In apparatus of the class described, the combination of a frame, axle mechanisms, power transmitting devices associated with each of said axle mechanisms, a pair of wheels mounted at the opposite ends of each of said axle mechanisms, driving means connected to each said power transmitting devices, U-members each pivoted at its free ends to said frame and at its center portion to one of said axle mechanisms, the pivot connections of said members with the adjacent axle mechanism being spaced from each other.

27. In apparatus of the class described, the combination of a frame, axle mechanisms, power transmitting devices associated with each of said axle mechanisms, a pair of wheels mounted at the opposite ends of each of said axle mechanisms, a motor mounted on one of said axle mechanisms and connected to each said power transmitting devices, U-members each pivoted at its free ends to said frame and at its center portion to one of said axle mechanisms, the pivot connections of said members with the adjacent axle mechanism being spaced from each other.

28. In apparatus of the character described, the combination of a frame, an axle mechanism, a pair of wheels mounted at the opposite ends of said axle mechanism, and U-shaped members, each pivoted at its free ends to said frame and at its center portion to said axle mechanism, one of said members being normally arranged substantially horizontally and the other of said members being normally arranged vertically.

29. In apparatus of the character described, the combination of a frame, an axle mechanism having a tail member, a pair of wheels mounted at the opposite ends of said axle mechanism, and U-shaped members, one of said members being normally arranged horizontally and pivoted at its free ends to said frame and at its center portion to said axle mechanism, and the other of said mem- 30. In apparatus of the character described, the combination of a frame, an axle mechanism having a tail member, a pair of wheels mounted at the opposite ends of said axle mechanism, power transmitting devices associated with said axle mechanism, a plate secured to said axle mechanism, and U-members, one of said members being normally arranged horizontally and pivoted at its free ends to said frame and at its center portion to said plate, and the other of said members being normally arranged vertically and pivoted at its free ends to said frame and at its center portion to said tail member.

31. In apparatus of the character described, the combination of a frame, an axle mechanism, a pair of wheels pivotally mounted at the opposite ends of said axle mechanism, a pair of compensating suspension members for said axle mechanism, each fulcrumed at one end to said frame and pivoted at its opposite end to said axle mechanism, the pivot connections of said members with the axle mechanism being spaced from each other longitudinally of said frame, and means for steering said wheels.

32. In apparatus of the class described, the combination of a frame, an axle mechanism, wheels mounted at the opposite ends of said axle mechanism, a suspension mechanism between said frame and axle mechanism comprising a pair of swingable members, one thereof pivotally connected to said axle mechanism at a point substantially in the vertical plane of the axis of said wheels but midway between the latter and the other thereof being pivotally connected to said axle mechanism at one side of said axis, and means for pivotally connecting said members to said frame at opposite sides of a line cutting their connection with said axle mechanism.

33. In apparatus of the class described, the combination of a frame, an axle mechanism for said frame provided with a pair of non-steerable wheels, a separate axle mechanism for said frame, and a pair of wheels pivotally mounted on said separate axle for steering purposes, each said axle mechanism comprising a center section and outer or end sections detachably connected to said center section, said outer or end sections of one axle mechanism being interchangeable with the outer or end sections of the other axle mechanism.

34. In apparatus of the class described, the combination of a frame, axle mechanisms, power transmitting devices associated with each of said axle mechanisms, a pair of non-steerable wheels mounted at the opposite ends of one of said axle mechanisms, and a pair of steerable wheels mounted at the opposite ends of the other axle mechanism, each said axle mechanism comprising a center section and outer or end sections detachably connected thereto, said outer sections on one axle mechanism being interchangeable with the outer sections on the other axle mechanism.

35. In apparatus of the class described, the combination of a vehicle frame, an axle mechanism, power transmitting devices including a propeller shaft and a motor having a shaft connected to said propeller shaft, a brake mechanism including a braking element secured to one of said shafts, means for operating said brake mechanism, and a suspension mechanism between said frame and axle mechanism preventing lateral thrusts and torque action of said axle mechanism.

36. In apparatus of the class described, the combination of a frame, an axle having wheels for supporting said frame, springs between the outer portions of said axle and the sides of said frame, and cooperating suspension elements between said springs disposed in spaced longitudinal relation and pivotally connected to said frame and having universal joint connection with said axle.

37. In apparatus of the class described, the combination of a frame, an axle having wheels, a power transmitting means on said axle and connected to said wheels to drive them, and suspension elements disposed in spaced longitudinal relation and pivoted to said frame and having universal joint connection with said axle and cooperating to permit relative movement between the frame and wheels due to unevenness in the road surface while maintaining at all times tractive effort between the wheels and road surface.

38. In apparatus of the class described, the combination of a frame, an axle having wheels for supporting said frame, and cooperating suspension elements disposed in spaced longitudinal relation, one of said elements being pivotally connected to said frame and axle and the other element being trunnioned on said frame and having universal joint connection with said axle.

In testimony whereof, we hereunto affix our signatures.

JOHN H. HERTNER.
EDWARD H. REMDE.